(12) United States Patent
Pasupuleti et al.

(10) Patent No.: US 9,690,818 B2
(45) Date of Patent: Jun. 27, 2017

(54) ON DEMAND LOCKING OF RETAINED RESOURCES IN A DISTRIBUTED SHARED DISK CLUSTER ENVIRONMENT

(75) Inventors: Kantikiran Krishna Pasupuleti, Visakhapatnam (IN); Anantha Kiran Kandukuri, Kanigiri (IN)

(73) Assignee: Sybase, Inc., Dublin, CA (US)

( * ) Notice: Subject to any disclaimer, the term of this patent is extended or adjusted under 35 U.S.C. 154(b) by 693 days.

(21) Appl. No.: 12/628,584

(22) Filed: Dec. 1, 2009

(65) Prior Publication Data
US 2011/0131193 A1   Jun. 2, 2011

(51) Int. Cl.
*G06F 17/30* (2006.01)
*G06F 9/52* (2006.01)

(52) U.S. Cl.
CPC ........ *G06F 17/30359* (2013.01); *G06F 9/526* (2013.01); *G06F 2209/523* (2013.01)

(58) Field of Classification Search
CPC ............... G06F 17/30362; G06F 9/526; G06F 12/0284; G06F 12/0871
USPC ............ 707/999.008; 711/E12.066, E12.094
See application file for complete search history.

(56) References Cited

U.S. PATENT DOCUMENTS

| | | | |
|---|---|---|---|
| 6,269,396 B1 * | 7/2001 | Shah et al. ................. 709/223 |
| 6,330,604 B1 * | 12/2001 | Higuchi et al. ............. 709/226 |
| 7,403,945 B2 * | 7/2008 | Lin .................. G06F 17/30362 |
| 2003/0145146 A1 * | 7/2003 | Posner et al. ................ 710/200 |
| 2006/0101081 A1 * | 5/2006 | Lin et al. ..................... 707/200 |
| 2007/0044103 A1 * | 2/2007 | Rosenbluth ............ G06F 9/526 718/104 |
| 2008/0065644 A1 * | 3/2008 | Pasupuleti ........ G06F 17/30551 |
| 2010/0023521 A1 * | 1/2010 | Arcese et al. .................... 707/8 |

* cited by examiner

*Primary Examiner* — Jason Liao
*Assistant Examiner* — Berhanu Mitiku
(74) *Attorney, Agent, or Firm* — Sterne, Kessler, Goldstein & Fox P.L.L.C.

(57) ABSTRACT

Systems, methods, computer program product embodiments are provided for locking retained resources of database information in a distributed shared disk cluster environment. An embodiment includes providing a request on demand for physical access to a page by a task of a node among a cluster of nodes, managing selective bypassing of waiting access requests to the page at intranode and internode levels in response to the request on demand, and handling requests for page ownership to prioritize a request on demand. Further included are determining whether another node holds a lock on the page and identifying an access type for the waiting access requests in order to coordinate transfer of the lock to the node.

20 Claims, 5 Drawing Sheets

ON DEMAND LOCKING OF RETAINED RESOURCES IN A DISTRIBUTED SHARED DISK CLUSTER ENVIRONMENT

BACKGROUND

Field of the Invention

The present invention relates generally to data processing environments, and more particularly to on demand locking of retained resources in a distributed shared disk cluster data processing environment.

Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In recent years, users have demanded that database systems be continuously available, with no downtime, as they are frequently running applications that are critical to business operations. Shared Disk Cluster systems are distributed database systems introduced to provide the increased reliability and scalability sought by customers. A Shared Disk Cluster database system is a system that has a cluster of two or more database servers having shared access to a database on disk storage. The term "cluster" refers to the fact that these systems involve a plurality of networked server nodes that are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP (symmetric multiprocessor) environments that provide fast performance by making multiple CPUs available to complete individual processes simultaneously (multiprocessing).

In any database system, distributed or otherwise, data can be organized and accessed as "pages". When data is brought from the disk into the main memory, "page" is the basic unit of access. Within the page, the data can be present as "rows". For a transactional system, multiple transactions can be active on a single page at any point of time, each accessing a subset of rows within the page, when the system uses row-level locking.

In a distributed system such as shared disk cluster, transactional locks or logical locks are used for transactional consistency. These locks can either be page-level locks in which the entire page is locked, or row-level locks in which a particular row in a page is locked, or higher-level locks, such as table locks that are used to lock the entire table. These locks are held for relatively long duration, e.g., until the end of the transaction.

For physical consistency of the page, such as when multiple transactions are modifying different rows in the same page at the same time, physical locks, also called latches in popular SMP terminology, are used. These locks are held for relatively short duration, e.g., only for the time it takes to modify the data in the page in memory. With the help of physical locks, the physical operations on a particular page are serialized under typical conditions. Commonly, these locks can be acquired in "shared" mode, "exclusive" mode, or "null" mode, where a shared physical lock is compatible with other shared physical locks but incompatible with an exclusive physical lock, and an exclusive physical lock is incompatible with shared and exclusive physical locks but compatible with "null" physical locks.

In a distributed system, the physical locks are retained at each node until they are claimed by other nodes. The retention of the locks in this manner avoids unnecessary repeated acquisition cycles that might occur if the locks are released immediately. For physical consistency, often, a two-level lock is used. The first level is the inter-node synchronization where the cluster-wide "physical lock" is acquired and the next level is an intra-node synchronization where the "latch" is acquired. The cluster-wide physical lock gives the right of access to a particular node that has acquired the lock, while the "latch" gives the right of access to a particular task within that node that has the physical lock.

The access to the page, i.e., the latches as well as the physical locks, is granted on a "first come, first served" basis. For instance, if a task requests a shared, SH, latch and is granted the latch, a second task requesting for the latch in exclusive, EX, mode will be blocked and be queued in a wait queue. If a third task requests the latch in SH mode, it too will blocked, and be placed behind the second task requesting for the EX latch in the wait queue. The behavior for the physical lock is similar at the node-level.

This behavior is not always optimal. For example, in certain situations, the SH waiters in the wait queue behind the EX waiter might have been granted the SH latch, as this is compatible with the SH owner, and such granting could have increased concurrency. However, if such granting would occur, it is possible that the EX waiter would continually be waiting in the presence of the SH waiters.

In most database systems, a threshold is used to strike a balance between allowing more concurrency with SH waiters and not starving the access to the EX waiter. Generally, while the threshold has not been reached, SH waiters are able skip the EX waiter in the wait queue, and once the threshold has been reached, the SH waiters queue up behind the EX waiters. While such operations allow for some efficiency, a problem exists, since the "threshold" is determined by a lock manager in the system and may not be set to an optimal value based on actual request behavior, which can change rapidly and render a particular threshold bad for a particular situation.

Accordingly, a need exists for an approach to locking retained resources in a distributed system that avoids the limitations and shortcomings of prior approaches and provides more optimized control for physical access. The present invention addresses this and other needs.

BRIEF SUMMARY

Briefly stated, the invention includes system, method, computer program product embodiments and combinations and sub-combinations thereof for locking retained resources of database information in a distributed shared disk cluster environment. An embodiment includes providing a request on demand for physical access to a page by a task of a node among a cluster of nodes, managing selective bypassing of waiting access requests to the page at intranode and internode levels in response to the request on demand, and handling requests for page ownership to prioritize a request on demand. Further included are determining whether another node holds a lock on the page and identifying an access type for the waiting access requests in order to coordinate transfer of the lock to the node.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for locking retained resources of database information in a distributed shared disk cluster environment.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. For example, although the following describes embodiments for distributed systems, it should be readily appreciated that the aspects of the invention are equally applicable to non-distributed systems, as well.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the MICROSOFT™ Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Figure 1:
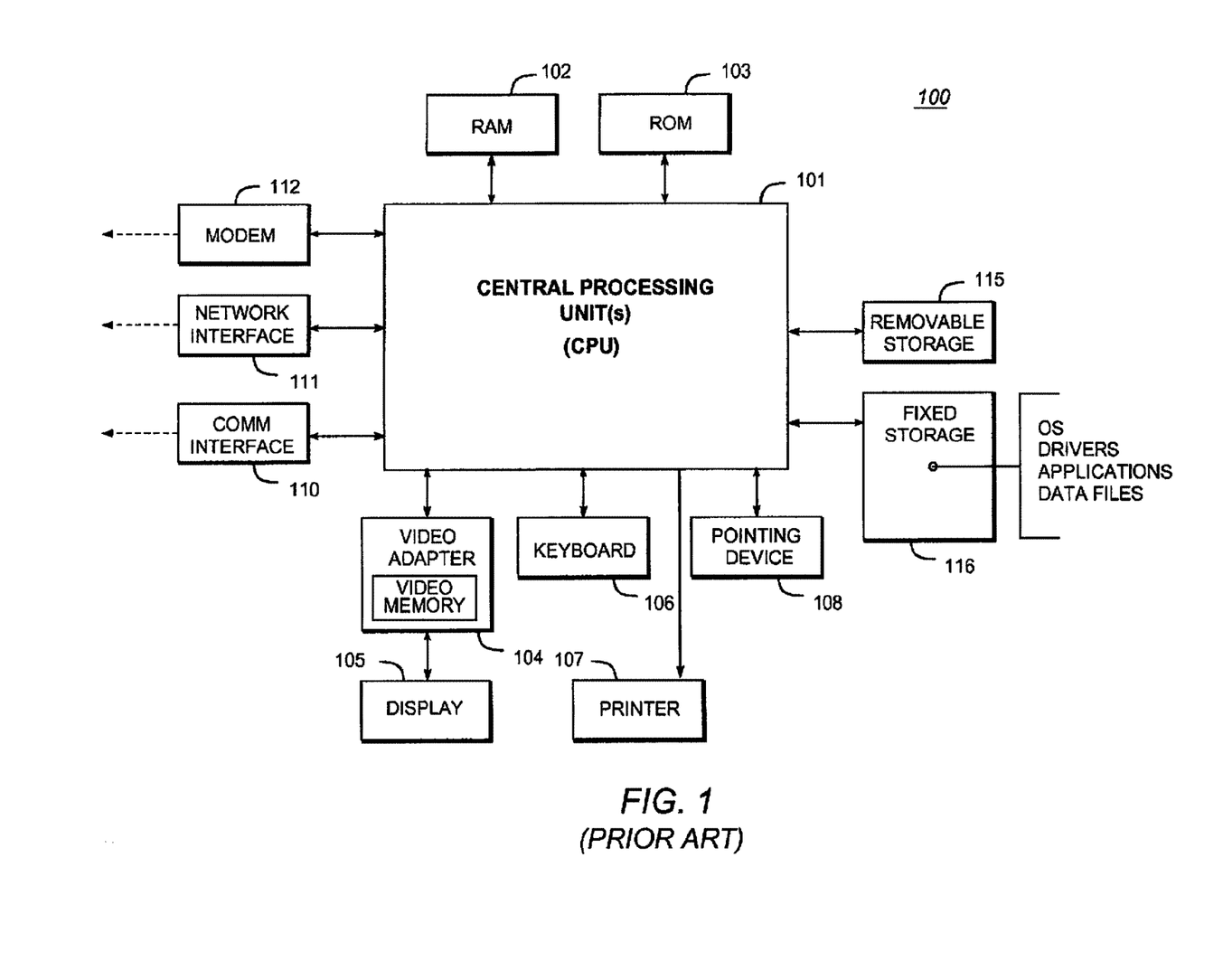
FIG. 1 illustrates a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem). The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (110), and device I/O. The OS can be provided by a conventional operating system, MICROSOFT™ Windows NT, MICROSOFT™ Windows 2000, MICROSOFT™ Windows XP, or MICROSOFT™ Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Figure 2:
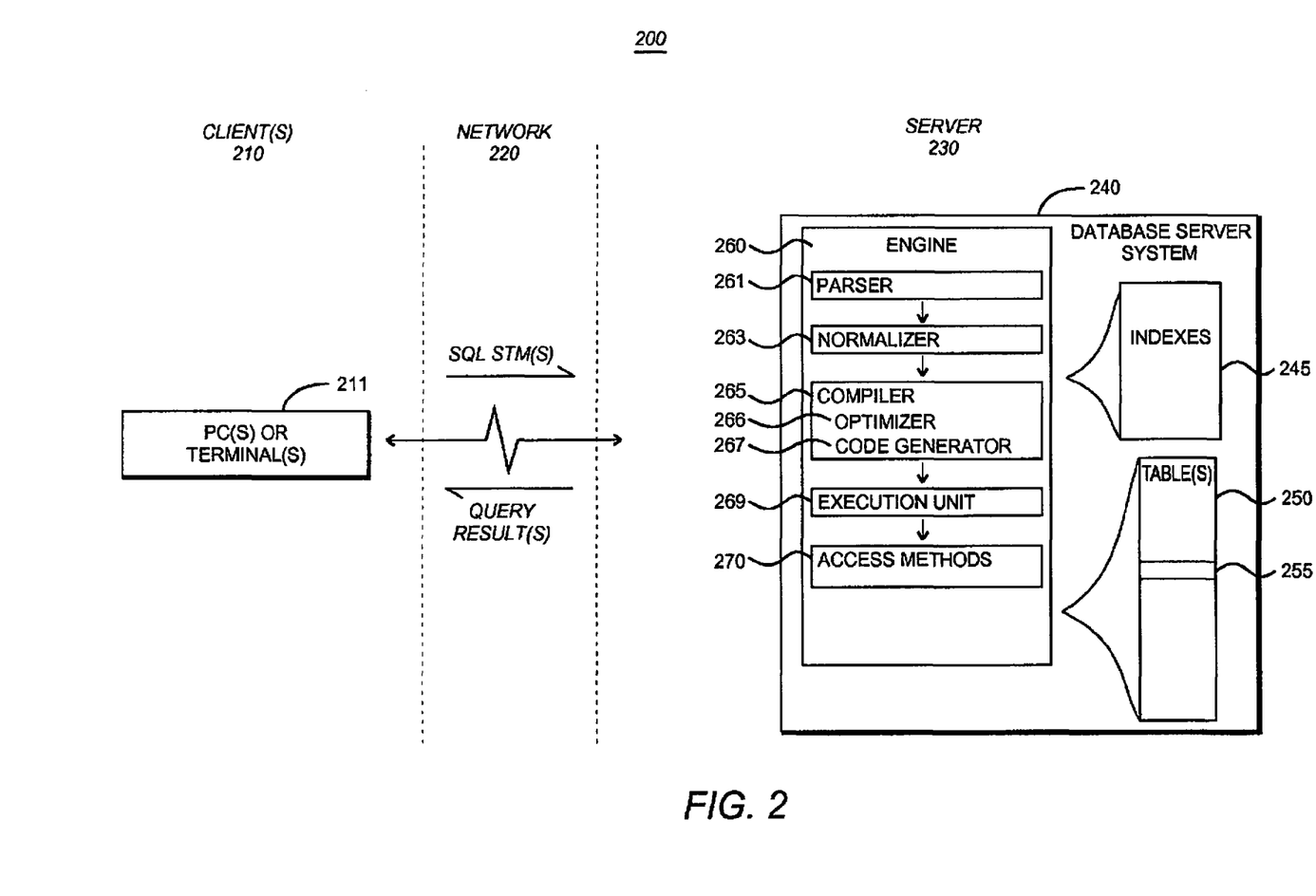
FIG. 2 illustrates the general structure of a client/server database system 200 suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a MICROSOFT™ Windows client operating system (e.g., MICROSOFT™ Windows 95/98, Windows 2000, Windows XP, Windows Vista).

The database server system 240, which comprises SYBASE™ ADAPTIVE SERVER™ Enterprise (available from Sybase, Inc. of Dublin, Calif.) in an exemplary embodiment, generally operates as an independent process (i.e., independently of the clients), running under a server operating system such as MICROSOFT™ Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of SYBASE™-branded database servers and client/server environments generally, see, e.g., Nath, A., "The Guide to SQL Server", Second Edition, Addison-Wesley Publishing Company, 1995. For a description of SYBASE™ ADAPTIVE SERVER™ Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb (kilobyte) to 32 Kb, with the most common page sizes being 2 Kb and 4 Kb. For purposes of the description that follows, it will be assumed that the database page size is 2 Kb, although it can be one of 2 Kb, 4 Kb, 8 Kb and 16 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record, which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying computer components (e.g., database server) that may be employed for implementing the present invention. For purposes of discussion, the following description will present examples in which it will be assumed that there exists a "server" (e.g., database server) for purposes of implementing the processes described below. In typical operation, such a server communicates with one or more other computers, including "clients" (e.g., customer or end-user computers that are "database clients" of the server). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Figure 3:
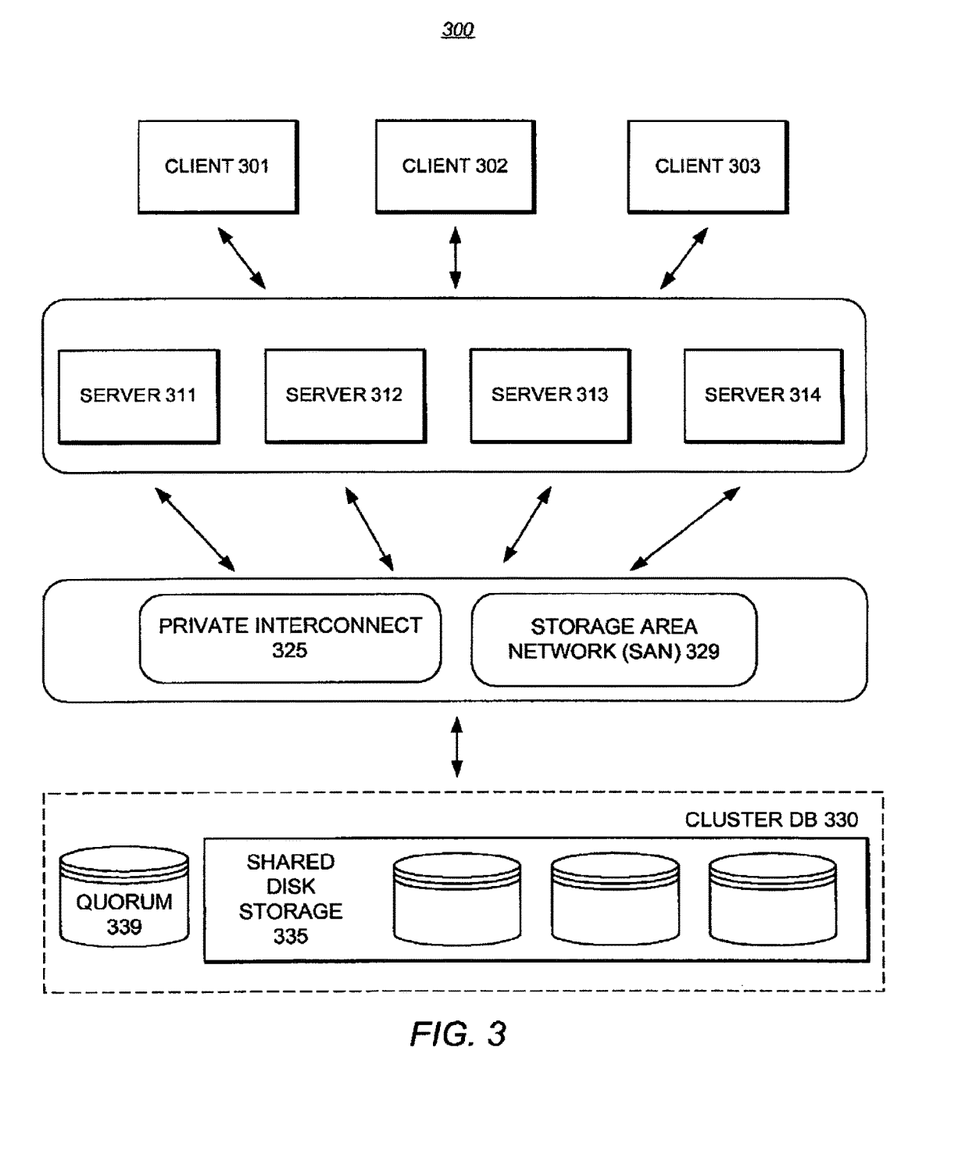
FIG. 3 illustrates a high-level block diagram of a Shared Disk Cluster database system environment useful for implementing components of embodiments of the invention.

As previously mentioned, one type of architecture of a distributed database system is a shared disk cluster (SDC) architecture. In this architecture, multiple computer systems, each with a private memory share a common collection of disks. Each computer system in a SDC is also referred to as a node. FIG. 3 is a high-level block diagram of a Shared Disk Cluster database system environment 300 illustrating an example of a four node (servers 311, 312, 313, 314) Shared Disk Cluster accessed by a plurality of clients (clients 301, 302, 303). The term "cluster" refers to a collection of more than one networked (and usually homogeneous) nodes, which function as a single system. Each node generally contains its own CPU and memory resources. The term "clustered server" refers to a database server (currently implemented using SYBASE™ ADAPTIVE SERVER™ Enterprise ("ASE") available from assignee Sybase of Dublin, Calif.) which runs on a cluster (cluster DB 330) and jointly manages a single installation of the databases on the shared disk storage 335. As shown, the environment 300 also includes a quorum disk 339. The quorum disk 339 is a shared disk device used for cluster membership arbitration. The quorum disk also maintains a history of runtime cluster view changes.

A Shared Disk Cluster database system can be implemented using low cost "blade servers" such as Intel/Linux machines. In the presently preferred embodiment, nodes in the cluster communicate with each other through private interconnects (e.g., private interconnect 325). As shown at FIG. 3, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 329) or with file system support (e.g., through use of a clustered file system such as those from Veritas or Polyserv).

The above-described computer hardware and software are presented for purposes of illustrating the basic underlying desktop and server computer components that may be employed for implementing the present invention. For purposes of discussion, the following description will present examples in which it will be assumed that there exist multiple server instances (e.g., database servers) in a Shared Disk Cluster environment that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Figure 4:
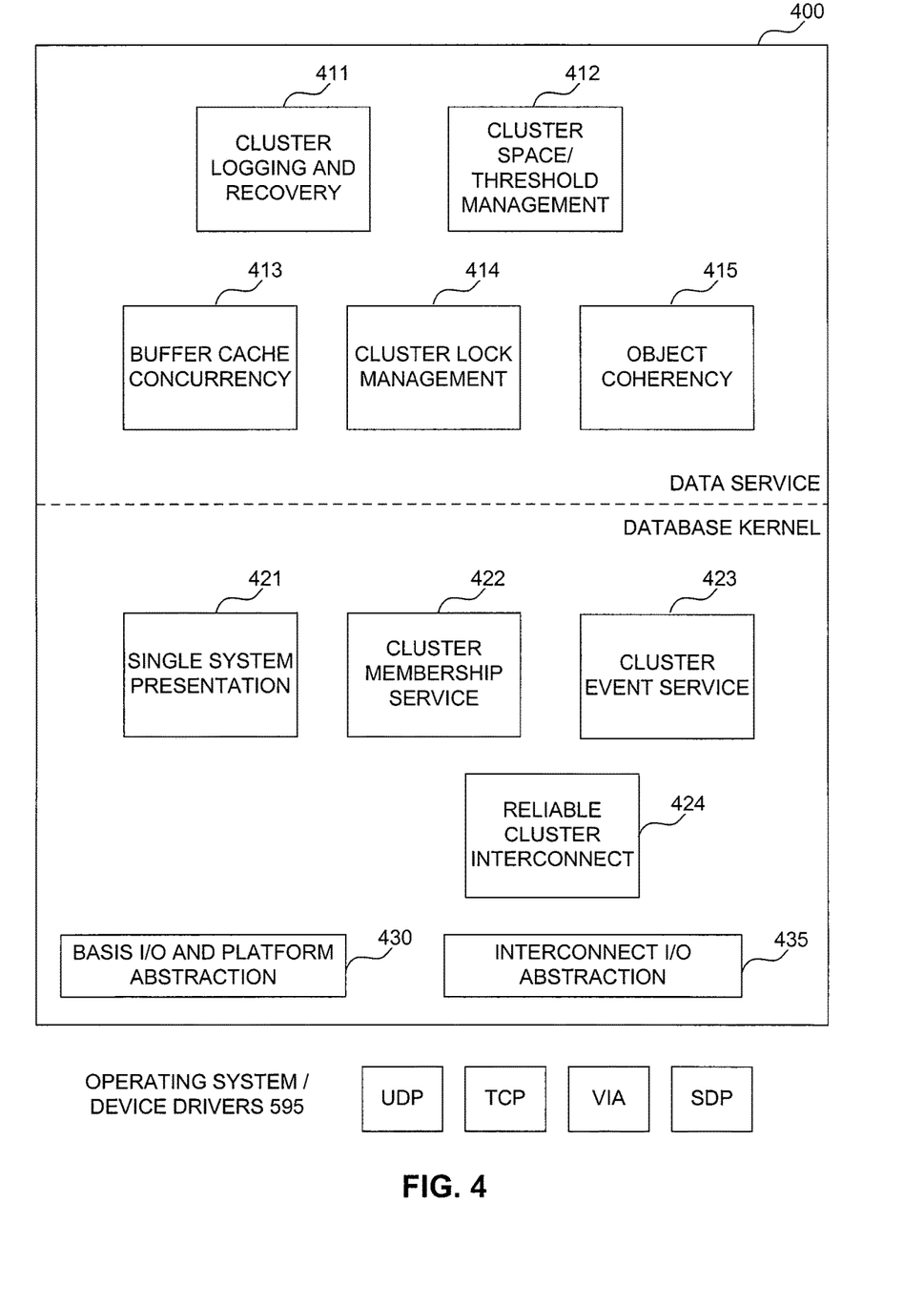
FIG. 4 is a block diagram illustrating components of an instance of a clustered database server implementing the shared disk cluster system and methodology of the present invention.

FIG. 4 is a block diagram illustrating components of an instance of a clustered database server 400 implementing the shared disk cluster system and methodology of the present invention. As shown, components of an instance of a clustered database server 400 includes data service level components and database server kernel level components. For simplicity, other conventional modules of the database system are not shown at FIG. 4. Also, the diagram shown at FIG. 4 does not attempt to illustrate the inter-dependencies among the cluster-aware components in a data server and in the kernel.

The components provided at the database kernel level include a single system presentation 421, a cluster membership service module 422, a cluster event service 423, and a reliable cluster interconnect module 424. These components are native cluster infrastructure components that enable the clustered database servers to run in a shared disk cluster environment. The cluster membership service module 422 maintains cluster membership and detects member failure. A responsibility of cluster membership service 422 is to detect cluster membership changes and maintain a reliable and consistent run time cluster view to all clustered servers. The cluster interconnect module 424 provides messaging services and an interconnect abstraction layer to allow clustered servers to communicate with each other via redundant interconnects. The cluster event service 423 supports a generic event publishing and subscription mechanism for cluster-wide events. The single system presentation module 421 supports single database presentation to clients and redirects client connections based on workload of the clustered servers and/or other criteria, such as application partitioning.

The database kernel level components also include a basis I/O and platform abstraction module 430 and an interconnect I/O abstraction module 435. An I/O abstraction layer is provided on top of the cluster platform specific private interconnects. It also supports redundant cluster interconnects (if available) with automatic fail-overs in the event of a link failure. The redundant cluster interconnects can be used to achieve both load balancing and high availability. As also shown at FIG. 4, several protocols are also supported under the I/O abstraction layer, including UDP (datagram socket), TCP (stream socket), VIA (Virtual Interface Architecture) and SDP (Socket Direct Protocol for Infiniband).

At the database data service level, components include a cluster logging and recovery module 411, a cluster space/threshold management module 412, a buffer cache coherency module ("BCM") 413, a cluster lock management module 414, and an object coherency module ("OCM") 415. The cluster logging and recovery module 411 deals with the issue of single logging from all clustered servers and fail-over database recovery. The cluster space and threshold management module 412 handles space utilization and implements threshold management methodology. The buffer cache coherency module 413 deals with the coherency issues related to shared buffer cache and cache to cache page transfer for allocation pages, index pages, data pages and OAM/GAM pages. The object coherency module 415 deals with the coherency issues related to sharing and transferring metadata and global variables in the shared disk cluster environment. The cluster lock management module 414 (or cluster lock manager which is sometimes referred to herein as the "CLM") supports distributed locking for coherency control across the shared disk cluster.

In operation, the CLM 414, comprises a module that is utilized to provides an interface (i.e., APIs) to lock individual database pages. Thus, the CLM 414 grants access to pages among the clusters, determines the optimal way of transferring the set of database pages, and takes the appropriate action, e.g., sending instruction messages to various nodes. Normally, when the CLM 414 gets a request for a physical lock from a node, it sends a downgrade request to any other node holding the lock in incompatible mode asking it to downgrade the lock and possibly transfer the latest version of the page. The lock manager at the owner node takes the request and hands it over to the buffer manager at that node. The buffer manager will wait if the page within that node is being accessed in an incompatible mode (i.e., if there are any latches held in incompatible mode), and when all such incompatible latches are released, it downgrades the physical lock, at which point the physical lock can be granted to the requesting node. The task at the requesting node will then proceed to latch the page in the same mode and access it.

Certain access patterns are not possible without causing deadlocks. An example of a mechanism for deadlock detection of locks in a cluster arrangement is described U.S. Pat. No. 7,403,945, entitled "Distributed Database System Providing Data and Space Management Methodology", issued Jul. 22, 2008, assigned to the assignee of the present invention, and incorporated herein by reference. The deadlock below is described using latches as an example, and as is commonly understood, there is no deadlock detection mechanism on latches, since they are supposed to be very quick operations and detection efforts would be inefficient use of CPU cycles. For instance, if a task, t1, holds a shared, SH, latch on a page, p1, and asks for a SH latch on another page, p2, but is blocked behind an exclusive, EX, latch waiter on p2, and another task, t2, holds a SH latch on p2 and asks for a SH latch on p1 but is blocked behind an EX latch waiter on p1, there is a deadlock. Note that the EX waiters in this example can be any other task. With this problem of potential deadlocks, client tasks generally cannot take SH latch on one page while holding a SH latch on a different page. While some systems use "conditional" latches, such that if the latch request fails, the client task backs-off, releasing the latches it holds and tries the entire exercise of latching both the pages again, this behavior is not always desirable particularly when the entire path to be re-traversed is long, and can significantly affect the performance of a system, particularly when the failure of a latch request doesn't necessarily mean a deadlock.

In accordance with embodiments of the invention, access patterns are achieved that improve performance, including situations where a task holds a physical lock and a latch on a page p1 in SH mode and can request for a physical lock and a latch on another page p2 in SH mode, skip waiters in the wait queue and not get into a deadlock. In the embodiments, the access control rests more directly with the client making the request, so that locks can be requested in a controlled manner as and when required to access highly contended pages (e.g., higher level index pages, etc.).

Figure 5:
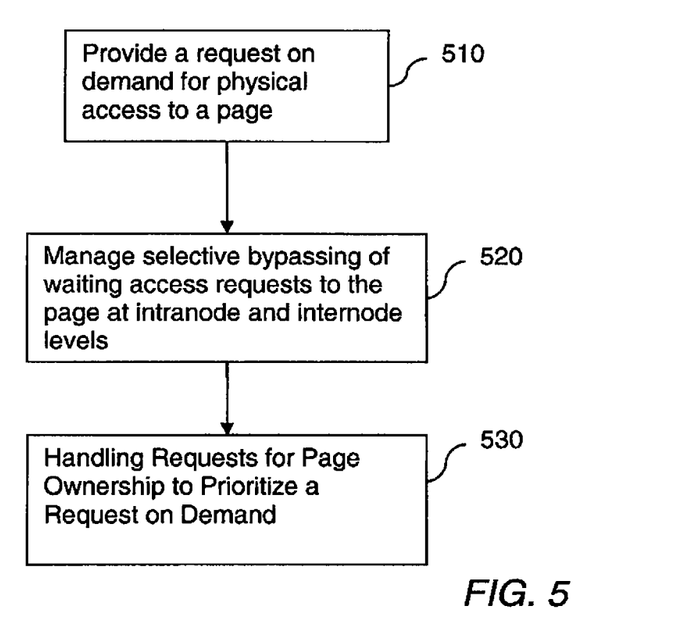
FIG. 5 illustrates a block diagram of an overall process for locking retained resources of database information in accordance with an embodiment of the invention.

Referring to FIG. 5, a block diagram of an overall process for locking retained resources of database information in accordance with an embodiment of the invention is presented. As shown, the process includes providing a request on demand for physical access to a page by a task of a node among a cluster of nodes (block 510), managing selective bypassing of waiting access requests to the page at intranode and internode levels in response to the request on demand (block 520), and handling requests for page ownership to prioritize a request on demand (block 530), where a downgrade of the lock held at the owner occurs to the demanded mode ahead of other downgrade requests if present.

To provide a request on demand, a new mode of access request is introduced. The demand mode allows a task which needs to access a page and decides to skip waiters on the lock to indicate its "demand" for the lock. This request to the physical access of a page has two parts to it—internode and intranode, so a physical lock, which provides the internode synchronization, is acquired in demand mode and subsequently a latch, which provides the intranode synchronization, is also acquired in demand mode.

At the cluster lock manager (internode part), the wait queue indicates different nodes waiting for the lock. In managing selective bypassing, the CLM 414 checks for any other nodes holding the lock, skips the waiters in the wait queue and pushes the demand request at the head of the wait queue. As a result, a new downgrade request on this page on behalf of this demand request is generated by the CLM 414 and is sent to the node which owns the lock. It is possible, however, that a downgrade request may have already been sent to the owner node on behalf of earlier requests that were in the wait queue. And, it is possible that the earlier request was also by a task from the same node as the demand request. Accordingly, the new downgrade request, called the demand downgrade request, includes a check at the owner node if an earlier downgrade request is complete. If the earlier request has already started the downgrade process or is at a stage where the downgrade request is guaranteed to complete within specific time (for example, the page transfer has already been started, there is no incompatible latch held etc.), the demand downgrade request is dropped. If not, the earlier request is dropped, and the demand downgrade request is honored. It must be noted that dropping the earlier submitted downgrade request is fine because the CLM 414 will re-send the request after the demand downgrade request is honored. This is because after the demanded lock is granted, the earlier submitted lock request comes to the head of the wait queue, and the CLM 414 will again send a downgrade message on behalf of it.

After the lock is downgraded by the owner node, the CLM 414 grants the lock to the demand requester which is at the head of the wait queue. Subsequently the next waiter for the lock will send a downgrade request to the new owner. If the next waiter is a non-demand requester from the same node as the owner, a downgrade request is sent to all the other nodes holding the lock in an incompatible mode.

After the demanded physical lock is granted, at the latch manager (intranode part), the demanded latch request is simply moved ahead of the waiters and is put at the head of the latch wait queue.

Thus, while acquiring physical access to the page in a distributed system through physical locks and latches, selective by-passing of the waiters in the wait queue both at the inter-node level (between the nodes) and the intra-node level (within the node) is performed in accordance with the embodiments of the invention. This allows tasks that scan pages while holding critical resources and need to release them quickly to be given priority in terms of skipping waiters. Also, for certain tasks that can run into deadlocks due to their scan behavior, e.g., if they hold latches (and hence physical locks, because physical locks cannot be downgraded until the latches are released) and request for physical access, (i.e physical locks and latches, on other pages), they can use the demand request mechanism to more efficiently scan pages and avoid deadlocks.

By way of example, the following cases help illustrate the embodiments of the invention by describing the setting and clearing of signals associated with nodes and their requests based on their ownership status, waiting request status, and request modes. It should be appreciated that the described approach is meant as illustrative and not restrictive of the manner of signaling, and other approaches could be used without departing from the spirit and scope of the invention, as is well understood in the art. Further, the described combinations are meant as representative and not restrictive of the types of situations possible.

In a first example case, suppose a node, n2, owns a page, p1, in SH mode. A node, n1, makes a request for a SH lock on p1 using a demand request. With no waiting requests for p1, CLM 414 grants the SH lock to n1 immediately.

In a second example, node n2 owns p1 in EX mode. A node n3 owns a second page, p2, in EX mode. Node n1 requests for SH lock on p1 and p2 using a demand request. There are no waiting requests for p1 or p2. Under this scenario, the CLM 414 sets a waiting signal on n1's lock requests for p1 and p2 and sets a demand downgrade signal request to n2 for p1 and to n3 for p2. When both n2 and n3 downgrade their locks on p1 and p2, respectively, the CLM 414 grants n1's request for p1 and p2.

In a further example, suppose node n2 owns p1 in SH mode. Node n3 is queued waiting for EX lock on p1. Node n1 requests for SH on p1 in demand request mode. When CLM 414 finds that n3 is waiting in the queue, it clears a pending downgrade signal on n2 for p1 and the waiting status on n3's lock request for p1, i.e it effectively cancels n3's lock request and grants SH lock to node n1 for p1. After this point, nodes n2 and n1 are the SH owners of the lock and n3's pending lock request is now picked up (it being next in the wait queue) and a downgrade message is sent to all the new owners (i.e n2 and n1) on behalf of n3.

Now suppose that node n2 owns page p1 in EX mode. And, node n3 is waiting for EX lock on p1. Node n1 requests for SH lock on p1 using a demand request. The CLM 414 finds that node n3 is queued and waiting. (Note that a downgrade message may have already reached n2 due to n3's lock request). The CLM clears the pending downgrade request on n2's lock for p1 and the waiting status on n3's lock request for p1, i.e., it effectively cancels n3's lock request. It moves n1's lock request to the head of the wait queue (by-passing n3's request in the wait queue), sets a waiting status on n1's lock request for p1 and sets a demand downgrade request on node n2's lock for p1. It sends a downgrade message to n2 on behalf of node n1. After the lock is downgraded by the owner node n2, the CLM 414 grants the lock to the demand requester (here, n1) which is at the head of the wait queue. Here, it can be noted that two downgrade messages, one due to n3's lock request and another due to n1's lock request, may simultaneously be present at n2. The buffer manager at n2 will detect they are duplicates and will handle the downgrade accordingly.

As described, with the demand mode request of the invention, the client can request for the physical lock and latch and indicate that it wants to skip the waiters in the wait queue. Latches and physical locks are typically held for short duration (although physical locks are retained at the node-level, the lock is free to be downgraded once the latch at that node is released), and since the clients have the best knowledge as to the purpose and the duration they will be holding the lock, they can decide when to skip the waiters and when not to. For instance, if the client already holds a latch on another hot page (e.g., a highly contended page) and it is imperative for it to release the latch on that page quickly, it can choose to request the subsequent latches in the demand mode. In a distributed system, where pages are being accessed by tasks from different nodes, any optimization, such as that achieved with the embodiments of the invention at the level of physical access to the page can provide significant performance benefits.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for locking retained resources of database information in a distributed shared disk cluster environment comprising a plurality of nodes, the method comprising:
    receiving a request on demand for physical access to a page by a task of a first node, wherein the request on demand is configured to allow the task to bypass out of order one or more waiting access requests to obtain a physical lock on the page and wherein the request on demand indicates a first lock mode;
    determining whether a second node holds a lock on the page, the lock having a second lock mode;
    determining whether the first lock mode and the second lock mode are compatible;
    sending a demand downgrade request to the second node currently owning the physical lock;
    determining whether a previous downgrade request has been sent to the second node;
    determining a status of the previous downgrade request, when a previous downgrade request has been sent;
    dropping the demand downgrade request when the previous downgrade request is estimated to be completed within a specific future time based, at least in part, on the determined status of the previous downgrade request and the determination of lock mode compatibility;
    dropping the previous downgrade request when the previous downgrade request is estimated to be completed outside a specific future time based, at least in part, on the determined status of the previous downgrade request and a determination that the first lock mode and the second lock mode are not compatible; and
    granting the first node physical access to the page, after the second node downgrades the physical lock.

2. The method of claim 1, wherein the previous downgrade request is estimated to be completed within a specific future time when a page transfer has started and the second node holds a compatible lock.

3. The method of claim 2, further comprising:
    placing the request on demand as a first request in a queue of the waiting access requests.

4. The method of claim 2, wherein an access type comprises a shared access request type and an exclusive access request type.

5. The method of claim 1, wherein the request on demand is received for a task with scan behavior that can cause a deadlock for the waiting access requests.

6. The method of claim 1, further comprising bypassing waiting access requests from the first node and from nodes other than the first node.

7. The method of claim 1, wherein the previous downgrade request is estimated to be completed outside a specific future time when a page transfer has not started.

8. A distributed shared disk cluster database system comprising:
    a plurality of nodes networked in a cluster and sharing disk storage having at least one database;
    a first node in the cluster that generates a request on demand for a task to obtain physical access to a page of the at least one database, wherein the request on demand is configured to allow the task to bypass out of order one or more waiting access requests to obtain a physical lock on the page and wherein the request on demand indicates a first lock mode; and
    a lock manager operating on the cluster that
        determines whether a second node holds a lock on the page, the lock having a second lock mode;
        determines whether the first lock mode and the second lock mode are compatible;
        sends a demand downgrade request to the second node currently owning the physical lock;
        determines whether a previous downgrade request has been sent to the second node;
        determines a status of the previous downgrade request, when a previous downgrade request has been sent;
        drops the demand downgrade request when the previous downgrade request is estimated to be completed within a specific future time based, at least in part, on the determined status of the previous downgrade request and the determination of lock mode compatibility;
        drops the previous downgrade request when the previous downgrade request is estimated to be completed outside a specific future time based, at least in part, on a determination that a page transfer has not started and the determination of lock mode compatibility; and
        grants the first node physical access to the page, after the second node downgrades the physical lock.

9. The system of claim 8, wherein the previous downgrade request is estimated to be completed within a specific future time when a page transfer has started and the second node holds a compatible lock.

10. The system of claim 9, wherein the lock manager further places the request on demand as a first request in a queue of the waiting access requests.

11. The system of claim 9, wherein an access type comprises a shared access request type and an exclusive access request type.

12. The system of claim 8, wherein the first node generating the request on demand generates the request on demand for a task with scan behavior that can cause a deadlock for the waiting access requests.

13. The system of claim 8, wherein the lock manager further bypasses waiting access requests from the first node and from nodes other than the first node.

14. The system of claim 8, wherein the previous downgrade request is estimated to be completed outside a specific future time when the second node holds an incompatible lock.

15. A non-transitory computer storage device having instructions stored thereon, that if executed by a processor, causes the processor to lock retained resources of database information, the instructions comprising:
receiving a request on demand for physical access to a page by a task of a first node, wherein the request on demand is configured to allow the task to bypass out of order one or more waiting access requests for the page by demanding a physical lock on the page and wherein the request on demand indicates a first lock mode;
determining whether a second node holds a lock on the page, the lock having a second lock mode;
determining whether the first lock mode and the second lock mode are compatible;
sending a demand downgrade request to the second node currently owning the physical lock;
determining whether a previous downgrade request has been sent to the second node;
determining a status of the previous downgrade request, when a previous downgrade request has been sent;
dropping the demand downgrade request when the previous downgrade request is estimated to be completed within a specific future time based, at least in part, on the determined status of the previous downgrade request and the determination of lock mode compatibility;
dropping the previous downgrade request when the previous downgrade request is estimated to be completed outside a specific future time based, at least in part, on the determined status of the previous downgrade request and a determination that the first lock mode and the second lock mode are not compatible; and
granting the first node physical access to the page, after the second node downgrades the physical lock.

16. The non-transitory computer storage device of claim 15, wherein the previous downgrade request is estimated to be completed within a specific future time when a page transfer has started and the second node holds a compatible lock.

17. The non-transitory computer storage device of claim 16, further comprising placing the request on demand as a first request in a queue of the waiting access requests.

18. The non-transitory computer storage device of claim 16, wherein an access type comprises a shared access request type and an exclusive access request type.

19. The non-transitory computer storage device of claim 15, wherein the received request on demand is for a task with scan behavior that can cause a deadlock for the waiting access requests.

20. The non-transitory computer storage device of claim 15, further comprising bypassing waiting access requests from the first node and from nodes other than the first node.

* * * * *